(12) United States Patent
Yoshihara et al.

(10) Patent No.: US 8,005,607 B2
(45) Date of Patent: Aug. 23, 2011

(54) DEVICE AND METHOD FOR CONTROLLING IGNITION TIMING OF INTERNAL COMBUSTION ENGINE

(75) Inventors: Masatomo Yoshihara, Toyota (JP); Kenji Kasashima, Nishikamo-gun (JP); Rihito Kaneko, Nishikamo-gun (JP); Koji Aso, Susono (JP); Kenji Senda, Okazaki (JP); Yuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 588 days.

(21) Appl. No.: 12/095,988

(22) PCT Filed: Dec. 4, 2006

(86) PCT No.: PCT/JP2006/324611
§ 371 (c)(1),
(2), (4) Date: Jun. 3, 2008

(87) PCT Pub. No.: WO2007/066785
PCT Pub. Date: Jun. 14, 2007

(65) Prior Publication Data
US 2010/0212634 A1 Aug. 26, 2010

(30) Foreign Application Priority Data
Dec. 5, 2005 (JP) .................. 2005-350891

(51) Int. Cl.
*F02P 5/152* (2006.01)
*G06F 19/00* (2011.01)
*H03F 1/26* (2006.01)

(52) U.S. Cl. .............. 701/111; 123/406.29; 123/406.34; 702/194

(58) Field of Classification Search ............. 123/406.16, 123/406.21, 406.29, 406.34, 406.39, 406.24, 123/406.26; 701/111, 114; 73/114.07, 114.08, 73/114.77, 118.02, 35.03, 35.04, 114.02; 702/182, 183, 185, 189–195
See application file for complete search history.

(56) References Cited

U.S. PATENT DOCUMENTS

| | | | | |
|---|---|---|---|---|
| 4,549,514 A | * | 10/1985 | Abe et al. ................. | 123/406.39 |
| 5,134,980 A | | 8/1992 | Sakakibara et al. | |
| 5,355,853 A | | 10/1994 | Yamada et al. | |
| 5,896,842 A | * | 4/1999 | Abusamra ................ | 123/406.39 |
| 6,311,672 B1 | * | 11/2001 | Morishita et al. ........ | 123/406.36 |

(Continued)

FOREIGN PATENT DOCUMENTS
EP 1 531 324 5/2005
(Continued)

*Primary Examiner* — Willis R Wolfe, Jr.
*Assistant Examiner* — Johnny H Hoang
(74) *Attorney, Agent, or Firm* — Oblon, Spivak, McClelland, Maier & Neustadt, L.L.P.

(57) ABSTRACT

An engine ECU executes a program that includes: calculating a median value and a standard deviation based on a calculated value based on the detected vibration of the engine; and subtracting a product of the standard deviation and a coefficient from the median value to calculate a magnitude of mechanical vibration specific to the engine. Knocking determination is carried out by comparing a knock magnitude calculated by dividing the magnitude value of the peak magnitude of the detected vibration of the engine by the magnitude of mechanical vibration specific to the engine with a predetermined determination value. Based on the knocking determination result, ignition timing of the engine is controlled.

12 Claims, 15 Drawing Sheets

U.S. PATENT DOCUMENTS

2005/0098156 A1    5/2005  Ohtani
2006/0288982 A1*  12/2006  Kaneko et al. ........... 123/406.39

FOREIGN PATENT DOCUMENTS

| JP | 3-121269 | 5/1991 |
| JP | 4 252840 | 9/1992 |
| JP | 5 256183 | 10/1993 |
| JP | 6 10819 | 1/1994 |
| JP | 8 4580 | 1/1996 |
| JP | 11 324785 | 11/1999 |
| JP | 2002 188504 | 7/2002 |
| JP | 2005-146924 | 6/2005 |

* cited by examiner

F I G. 1
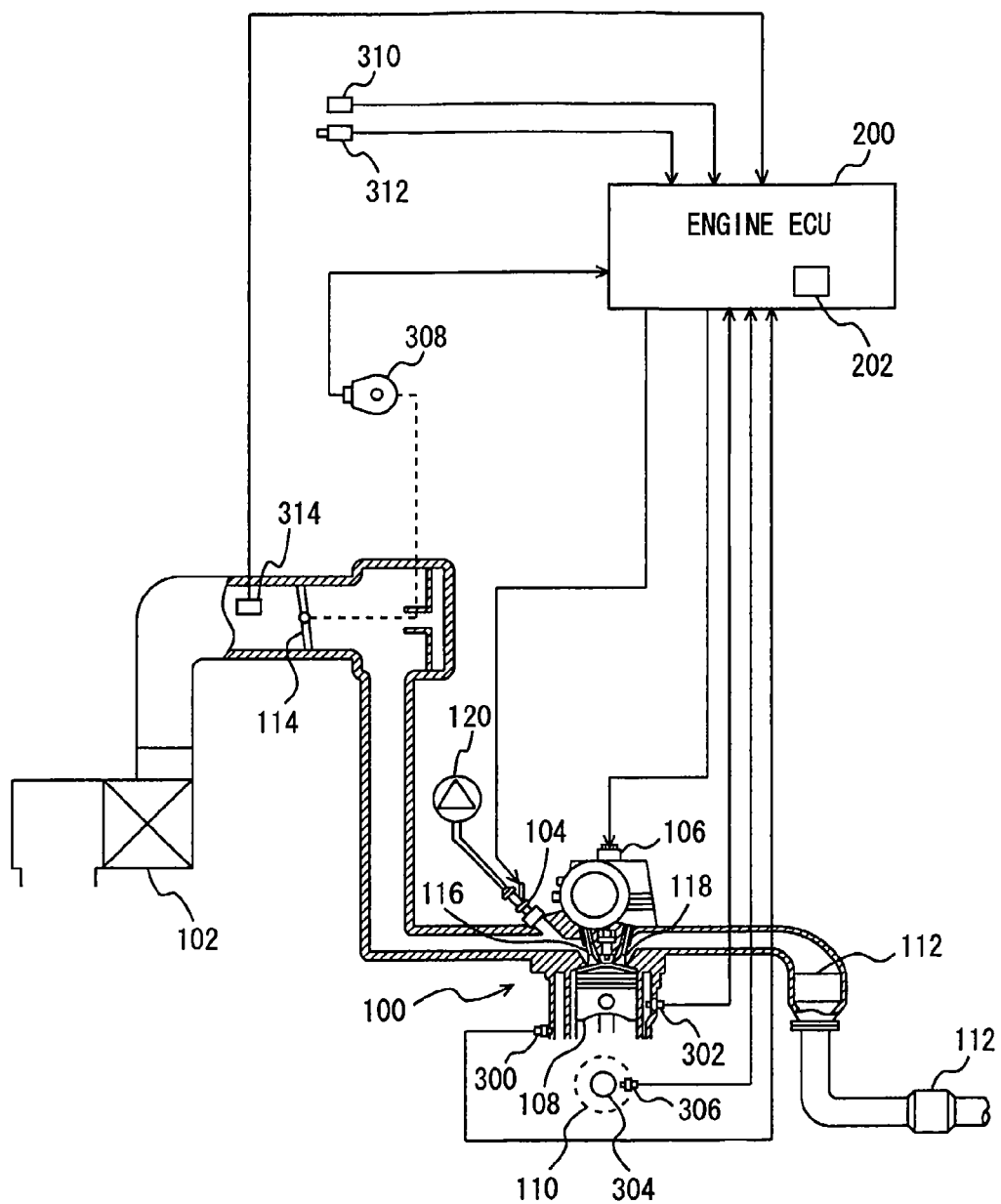

FIG. 7

| A | C | B |
|---|---|---|
| B | C | B |
| A | B | A |

ENGINE SPEED NE

INTAKE AIR AMOUNT KL

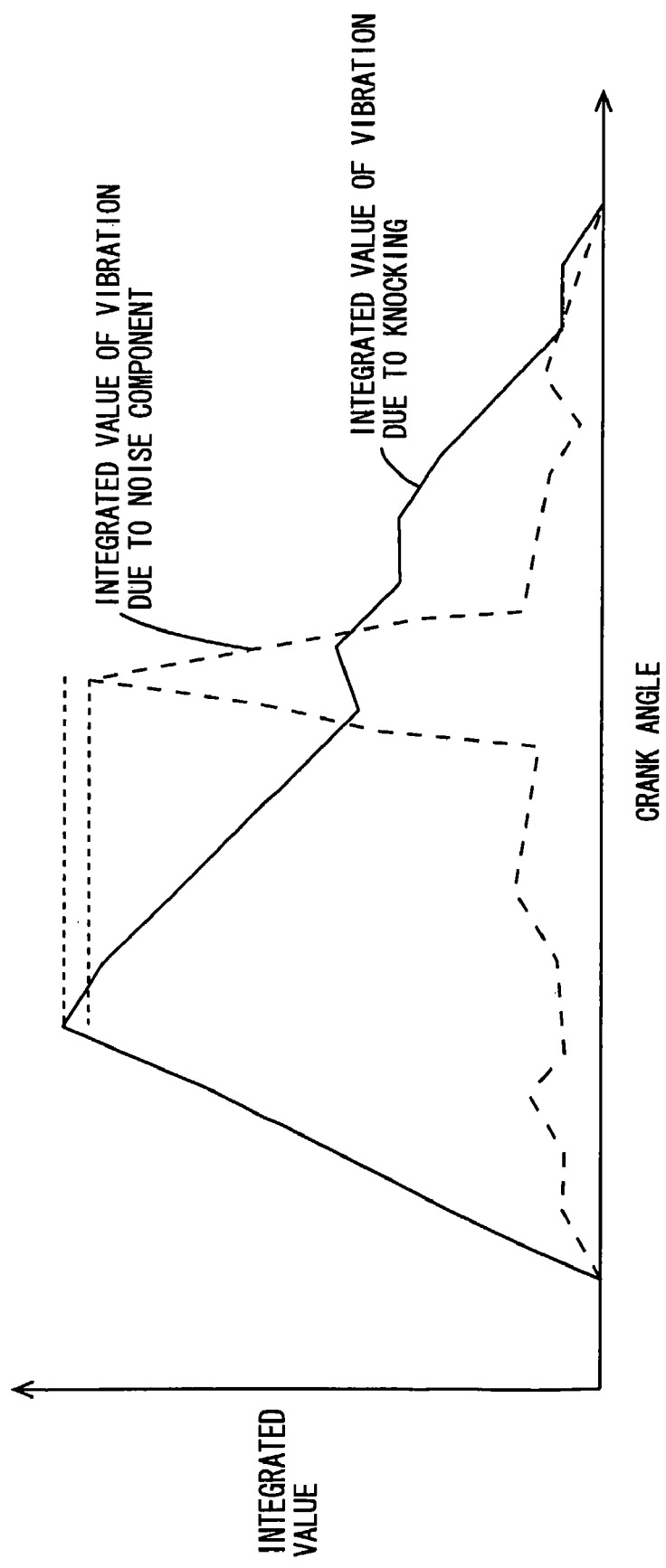

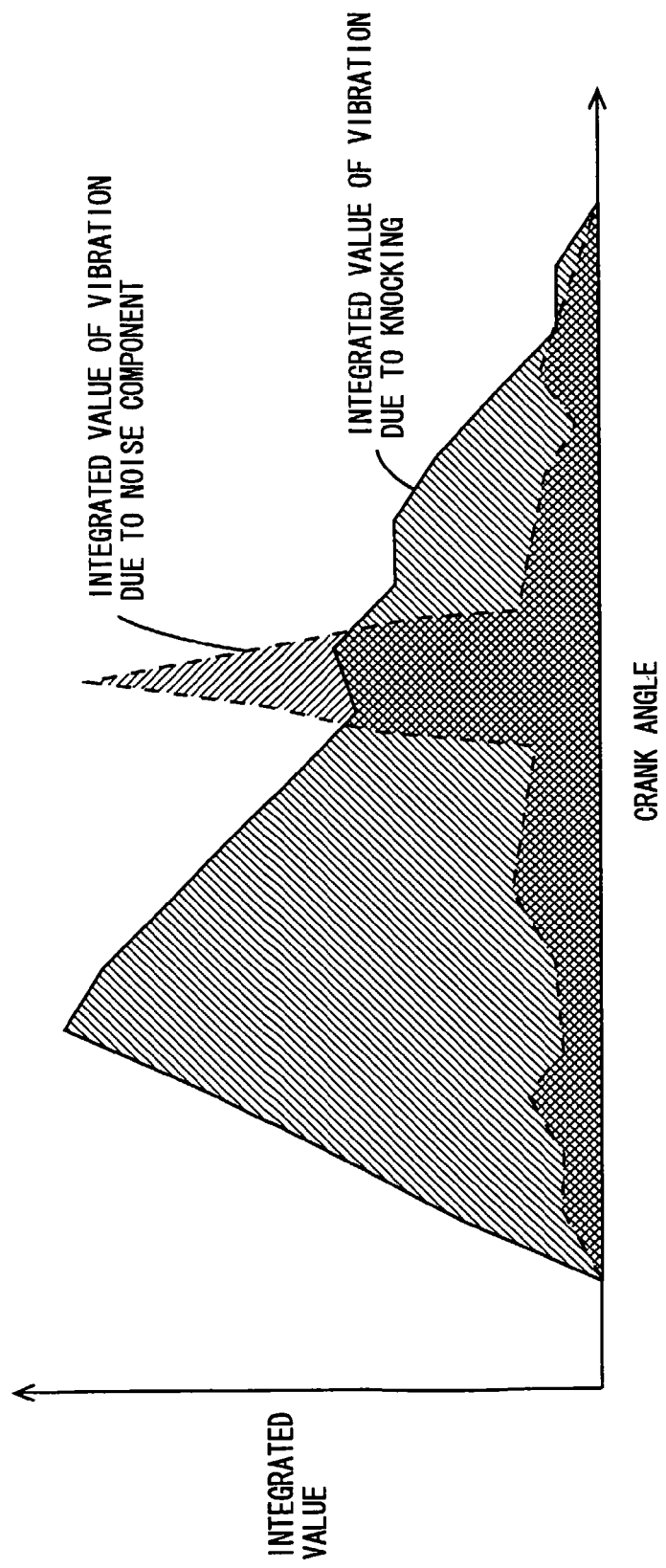

DEVICE AND METHOD FOR CONTROLLING IGNITION TIMING OF INTERNAL COMBUSTION ENGINE

TECHNICAL FIELD

The present invention relates to device and method for controlling ignition timing of an internal combustion engine, and particularly to a technique of controlling ignition timing based on whether knocking is present or absent.

BACKGROUND ART

Conventionally, techniques of determining whether knocking is present or absent in an combustion engine are known. For example, there is a technique of determining whether knocking is present or absent based on whether or not magnitude of vibration detected in an internal combustion engine is greater than a knocking determination value. The magnitude of vibration detected by the technique includes mechanical vibration of the internal combustion engine itself. The mechanical vibration of the internal combustion engine itself varies by the speed of the internal combustion engine. Accordingly, in order to improve the precision of knocking determination, it is necessary to carry out knocking determination taking into account of the mechanical vibration of the internal engine itself which varies by the speed of the internal combustion engine.

Japanese Patent Laying-Open No. 8-4580 discloses a knocking determining device for an internal combustion engine that can determine knocking without impairing the capability of following the variation of the engine speed. The knocking determining device for an internal combustion engine disclosed in Japanese Patent Laying-Open No. 8-4580 includes: a knock sensor detecting vibration of an internal combustion engine and converting it into an electric signal level; a magnitude correcting device correcting magnitude of the electric signal from the knock sensor with an engine speed; a background level setting device calculating a weighted average of magnitude correction values corrected by the magnitude correcting device and updating and setting the weighted average value as a background level; and a knocking determining device determining whether there is knocking in the internal combustion engine in accordance with the magnitude correction value corrected by the magnitude correcting device and the background level set by the background level setting device.

According to the knocking determining device for an internal combustion engine disclosed in the publication, in consideration of the amplitude of vibration of the engine being proportional to an engine speed, the background level that is to be the standard for determining knocking and a magnitude signal from the knock sensor are corrected with an engine speed. That is, by setting the background level to be the standard for determination as a value that is not susceptible to the level variation due to an engine speed, knocking determination that can address any speed of the engine can be carried out. Accordingly, even in a transient mode of the engine where the engine speed sharply rises or falls, knocking determination can be carried out without impairing the capability of following the variation of the engine speed.

However, in the knocking determining device for an internal combustion engine disclosed in Japanese Patent Laying-Open No. 8-4580, the background level to be the standard for determining knocking is set based on an electric signal detected in the vibration of the internal combustion engine, which includes vibration due to knocking in addition to the mechanical vibration of the internal engine itself. As a result, the background level includes the effect of the magnitude of vibration due to knocking in addition to the magnitude of the mechanical vibration of the internal combustion engine itself. Thus, in the knocking determining device for an internal combustion engine disclosed in Japanese Patent Laying-Open No. 8-4580, the background level varies depending on whether there is knocking or not. In this case, even when there is knocking, knocking determination may not be carried out appropriately. Thus, there has been a problem that the ignition timing cannot properly be retarded when there is knocking or the ignition timing cannot properly be advanced when there is no knocking.

DISCLOSURE OF THE INVENTION

The object of the present invention is to provide a device and the like for controlling ignition timing of an internal combustion engine that can appropriately control ignition timing.

A device for controlling ignition timing of an internal combustion engine according to the present invention includes an operation unit. The operation unit detects a first value related to magnitude of vibration of the internal combustion engine. The operation unit calculates a median value and a standard deviation based on the first value. The operation unit calculates a second value related to magnitude of vibration of the internal combustion engine by subtracting a product of the standard deviation and a predetermined constant from the median value. The operation unit calculates a knock magnitude related to magnitude of vibration of the internal combustion engine based on the second value. The operation unit controls ignition timing of the internal combustion engine based on a result of comparison between the knock magnitude and a predetermined value.

According to the present invention, a first value related to magnitude of vibration of the internal combustion engine is detected. The value of the magnitude of vibration detected in the internal combustion engine is different for each individual internal combustion engine, due to variation of the dimension of engines actually manufactured, variation of the output of sensors such as a knock sensor, and degradation of the knock sensor. Similarly, the value of magnitude of mechanical vibration of the internal combustion engine included in the detected values of magnitude of vibration is different for each individual internal combustion engine. Since the first value is a value actually detected in each individual internal combustion engine, it is specific to individual internal combustion engine. A median value and a standard deviation of the first values are calculated. By subtracting the product of the standard deviation and a predetermined constant (for example "1") from the median value, the second value is calculated. In the operation condition where knocking frequently occurs, as compared with an operation condition where no knocking occurs, great magnitude of vibration is more frequently detected. As a result, the median value and the standard deviation become greater values. Accordingly, the second value obtained by subtracting the product of the standard deviation and a predetermined constant from the median value becomes a stable value that substantially hardly affected by knocking. Thus, the second value can be regarded as a value representing magnitude of mechanical vibration specific to individual internal combustion engine. Based on the second value, the knock magnitude is calculated. For example, the knock magnitude is calculated by dividing a value related to magnitude of vibration detected in the internal combustion engine by the second value. Thus, the knock magnitude can be calculated as a value representing a relative magnitude to the second value representing the magnitude of mechanical vibration. As a result, the knock magnitude can be obtained as a value representing magnitude of vibration due to a factor other than the mechanical vibration specific to the internal combustion engine. Based on the result of comparison between this knock magnitude and a predetermined value, ignition timing is controlled. For example, whether or not knocking has occurred is determined by comparing the knock magnitude with the predetermined determination value, and based on the determination result, ignition timing is retarded or advanced. Thus, a device for controlling ignition timing of the internal combustion engine that can precisely determine whether knocking is present or absent to appropriately control ignition timing can be provided.

Preferably, the standard deviation is a standard deviation of the first values that are smaller than the median value.

According to the present invention, the standard deviation is a standard deviation of the first values that are smaller than the median value calculated based on the first values. Here, if knocking has occurred, as compared with a case where knocking has not occurred, the median value and the standard deviation of the first values smaller than the median value become greater. The second value is calculated by subtracting the product of the great standard deviation and a predetermined constant from the great median value. This second value becomes a stable value that is substantially the same as the second value in the case where knocking has not occurred. Accordingly, the second value can be regarded as a value that represents magnitude of mechanical vibration specific to the internal combustion engine, being hardly affected by knocking. Based on such a second value, the knock magnitude is calculated. For example, the knock magnitude is calculated by dividing a value related to magnitude of vibration detected in the internal combustion engine by the second value. Thus, the knock magnitude can be obtained as a value representing a relative magnitude to the second value representing the magnitude of mechanical vibration. As a result, the knock magnitude representing magnitude of vibration due to a factor other than the mechanical vibration specific to the internal combustion engine can be obtained. Based on the comparison between such a knock magnitude and a predetermined value, ignition timing is controlled. For example, whether or not knocking has occurred is determined by comparing the knock magnitude with the predetermined determination value, and based on the determination result, ignition timing is retarded or advanced. Thus, whether knocking is present or absent can precisely be determined and ignition timing can be retarded or advanced appropriately.

Preferably, the operation unit further detects a third value related to magnitude of vibration of the internal combustion engine, and the operation unit performs correction by dividing the third value by the second value, to calculate the knock magnitude.

According to the present invention, a third value related to magnitude of vibration of the internal combustion engine is detected. Correction is performed by dividing the third value by the second value, to calculate the knock magnitude. Thus, the knock magnitude can be calculated as a value representing a relative magnitude to the second value representing the varying magnitude of mechanical vibration. As a result, the knock magnitude representing magnitude of vibration due to a factor other than the mechanical vibration specific to the internal combustion engine can be obtained. Based on the comparison between such a knock magnitude and a predetermined value, ignition timing is controlled. For example, whether or not knocking has occurred is determined by comparing the knock magnitude with the predetermined determination value, and based on the determination result, ignition timing is retarded or advanced. Thus, whether knocking is present or absent can precisely be determined and ignition timing can be retarded or advanced appropriately.

BRIEF DESCRIPTION OF THE DRAWINGS

FIG. 1 is a schematic configuration diagram of an engine controlled by an engine ECU which is an ignition timing control device according to an embodiment of the present invention;

FIG. 7 is a chart showing a map of a determination value V(KX) stored in the memory of the engine ECU;

FIG. 17 is a chart (No. 1) showing an integrated value at the time of knocking and an integrated value by noise; and FIG. 18 is a chart (No. 2) showing an integrated value at the time of knocking and an integrated value by noise.

BEST MODES FOR CARRYING OUT THE INVENTION

Figure 2:
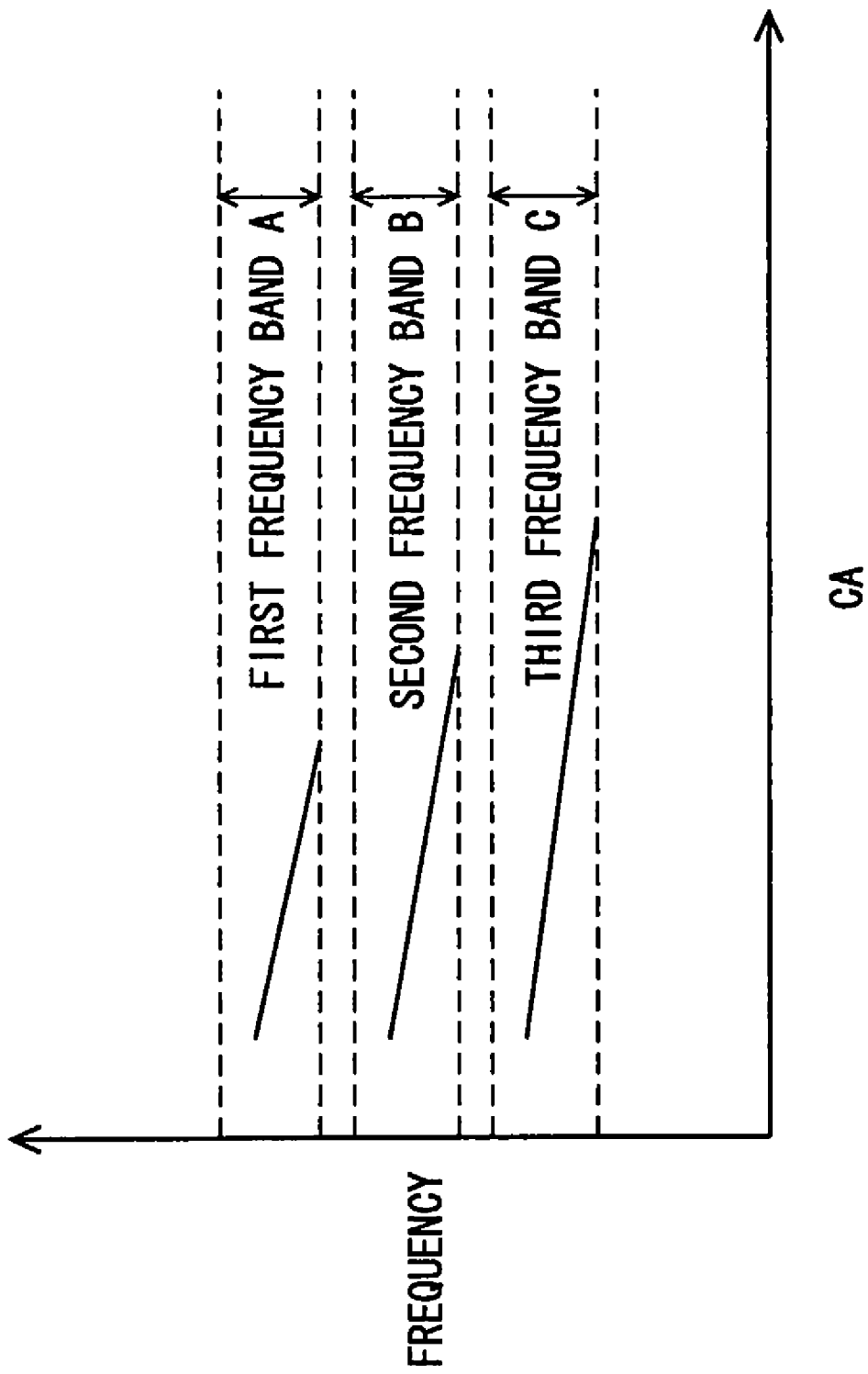
FIG. 2 is a chart showing a frequency band of vibration generated in the engine at the time of knocking.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control device according to the embodiment of the present invention will be described. The ignition timing control device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine. ECU 200.

Engine ECU 200 performs computation based on signals sent from the respective sensors and ignition switch 312 and a map and the program stored in memory 202 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal and the crank angle sent from knock sensor 300 and determines whether or not knocking has occurred in engine 100 based on the detected vibration waveform. The knock detection gate in the embodiment is from a top dead center) (0°) to 90° in a combustion stroke. The knock detection gate is not limited to it.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
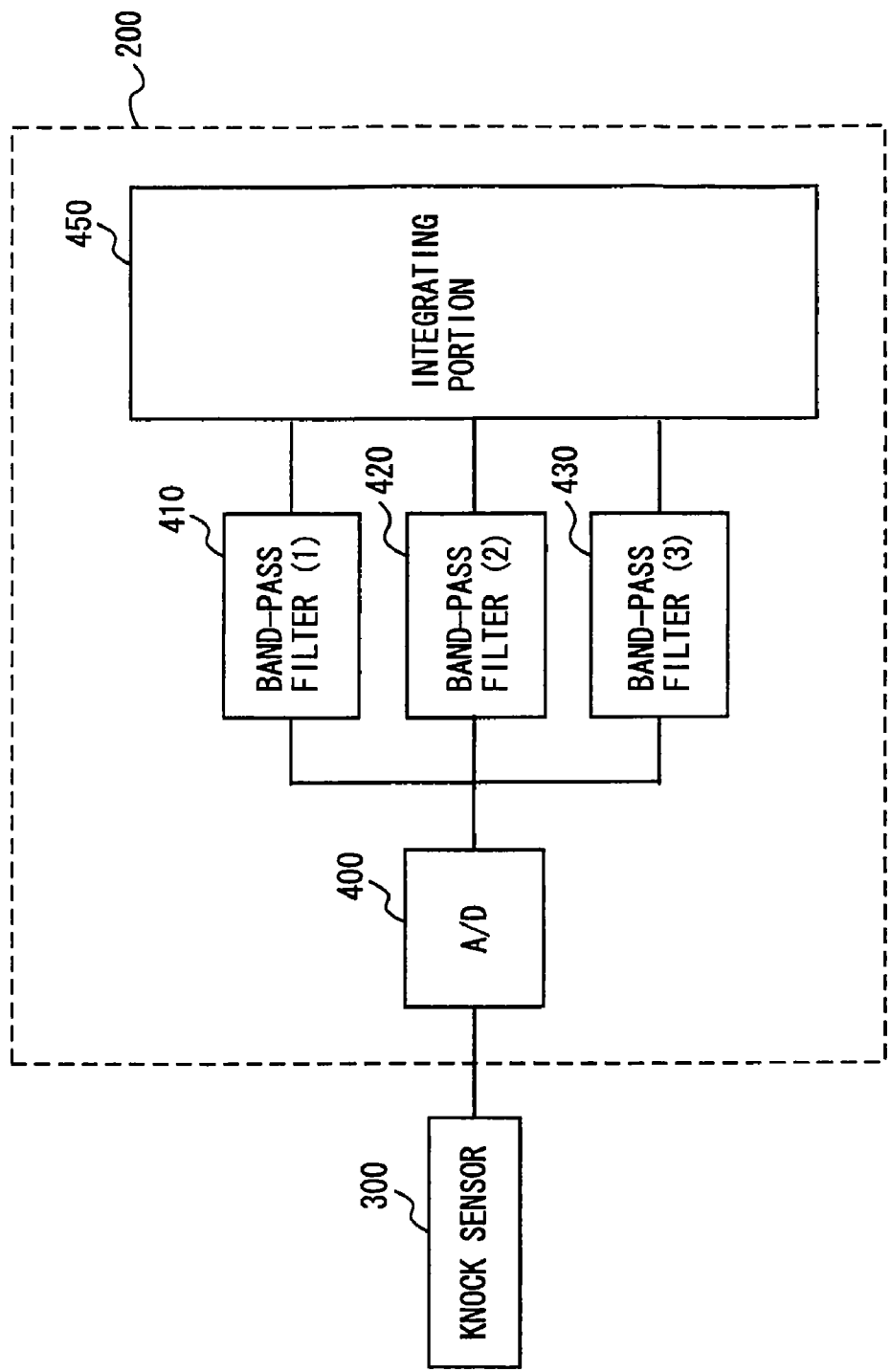
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
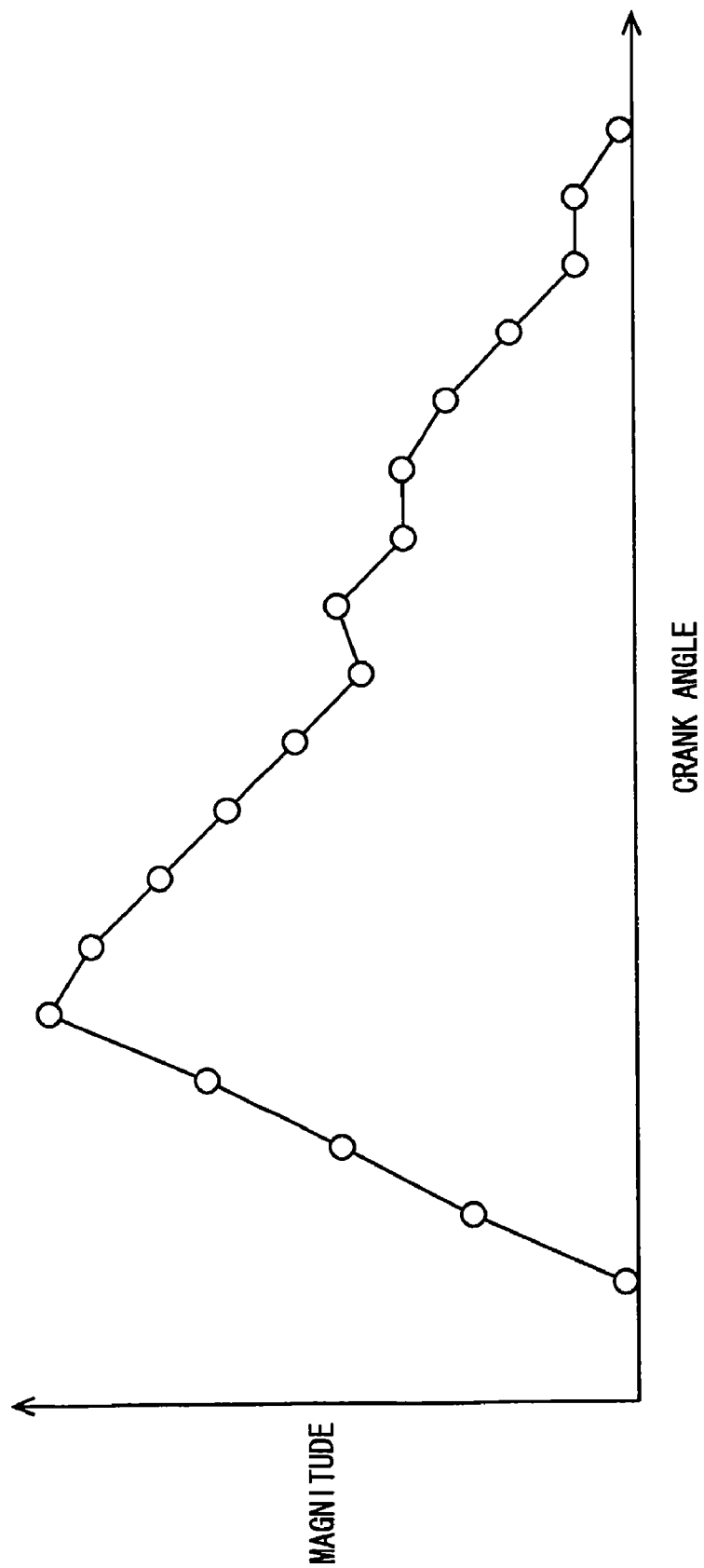
FIG. 4 is a chart showing a waveform of vibration in the engine.

As a result, as shown in FIG. 4, a vibration waveform of engine 100 is detected. In other words, the synthesized waveform of the first to third frequency bands A to C are used as the vibration waveform of engine 100.

Figure 5:
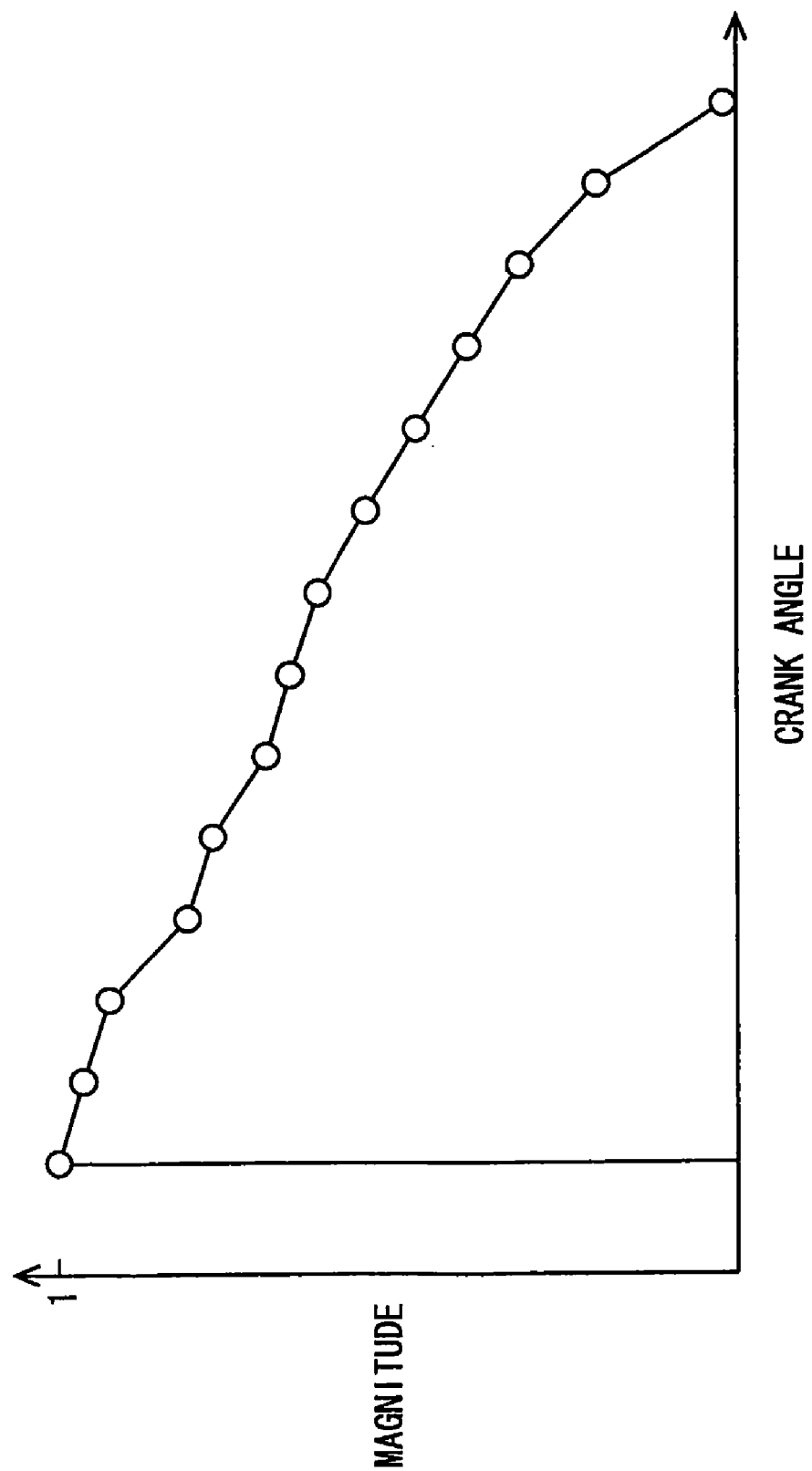
FIG. 5 is a chart showing a knock waveform model stored in memory of the engine ECU.

The detected vibration waveform is compared with a knock waveform model stored in memory 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values, of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
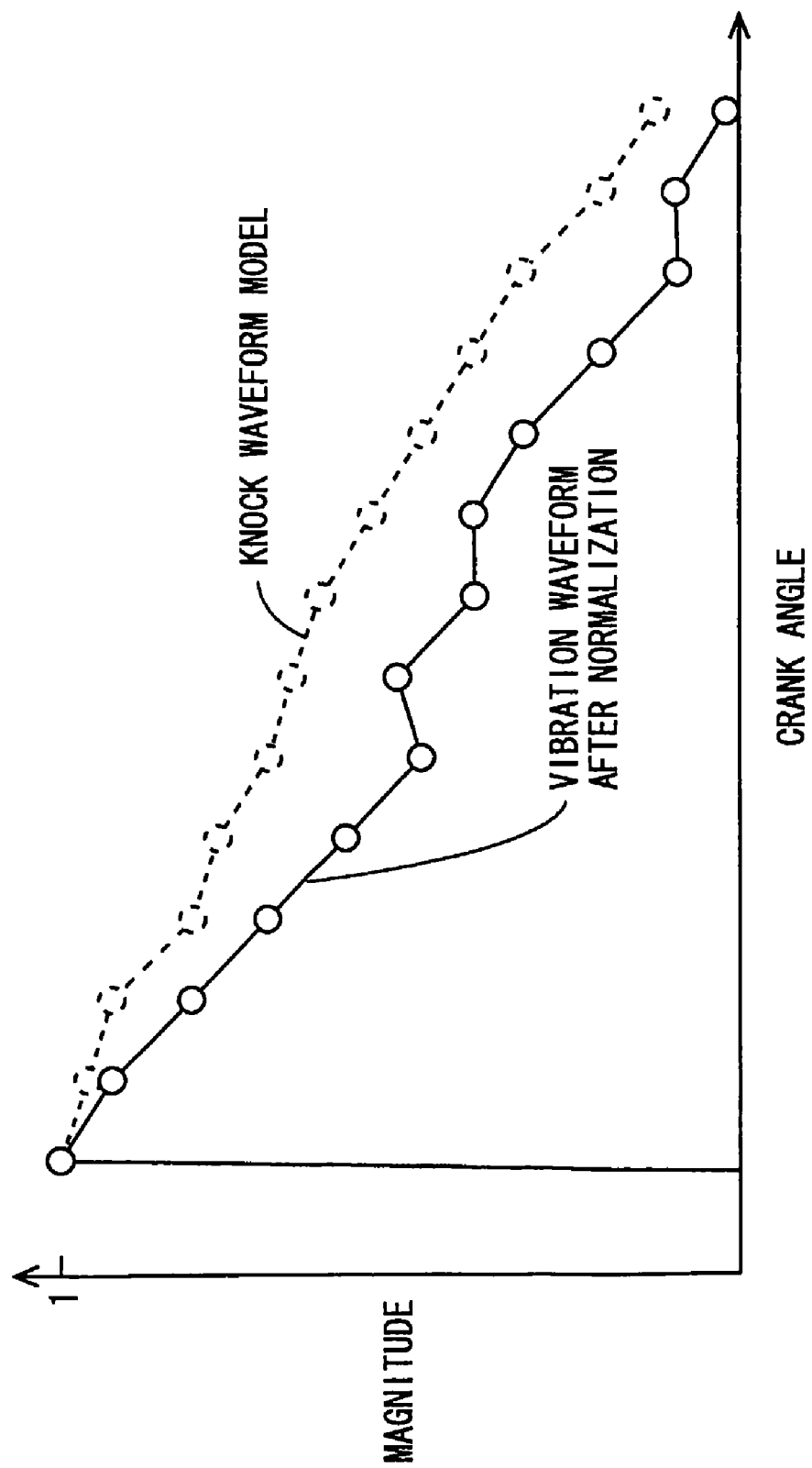
FIG. 6 is a chart for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of the vibration in the knock waveform model by the crank angle is S, correlation coefficient K is calculated by an equation, $K=(S-\Sigma \Delta S(I))/S$, where $\Sigma \Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If a value obtained by logarithmically converting the maximum integrated value P is magnitude value LOG(P) and a value representing the magnitude of mechanical vibration specific to engine 100 is BGL (Back Ground Level), knock magnitude N is calculated by an equation, N=LOG(P)/BGL. A method of calculating knock magnitude N is not limited to it.

In the embodiment, engine ECU 200 compares knock magnitude N calculated using BGL and a determination value V(KX) stored in memory 202 with each other, and based on the result of comparison of the detected waveform and the stored knock waveform model, determines whether or not knocking has occurred in engine 100 for every ignition cycle. As shown in FIG. 7, determination values V(KX) are stored as a map using an engine speed NE and an intake air amount KL as parameters. As an initial value of determination value V(KX), a value determined in advance by experiment or the like is used.

However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination value V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine, speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG(V) (e.g., 200 cycles), are calculated for each ignition cycle by the following calculation method.

If a currently detected magnitude value LOG(V) is greater than a previously calculated median value V(50), then a value obtained by adding a predetermined value C(1) to, the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

Figure 8:
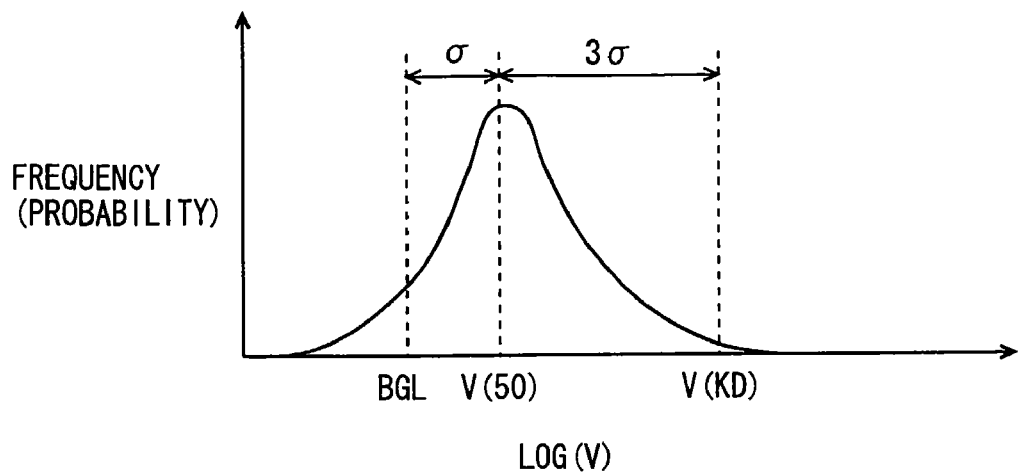
FIG. 8 is a chart (No. 1) showing frequency distribution of magnitude values LOG(V)

Using median value V(50) and standard deviation σ, a knock determination level V(KD) is calculated. As shown in FIG. 8, a value obtained by adding the product of a coefficient U(1) (U(1) is a constant and U(1)=3, for example) and standard deviation σ to median value V(50) is a knock determination level V(KD). A method of calculating knock determination level V(KD) is not limited to it. It is determined that the frequency of occurrence of magnitude values LOG(V) greater than knock determination level V(KD) is a frequency of occurrence of knocking. Based on the frequency of occurrence of knocking, determination value V(KX) is corrected.

Coefficient U(1) is a coefficient obtained based on data and findings obtained by experiments and the like. Magnitude value LOG(V) greater than knock determination level V(KD) when U(1)=3 substantially agrees with magnitude value LOG (V) in an ignition cycle in which knocking has actually occurred. It is also possible to use other values than "3" as coefficient U(1).

Figure 9:
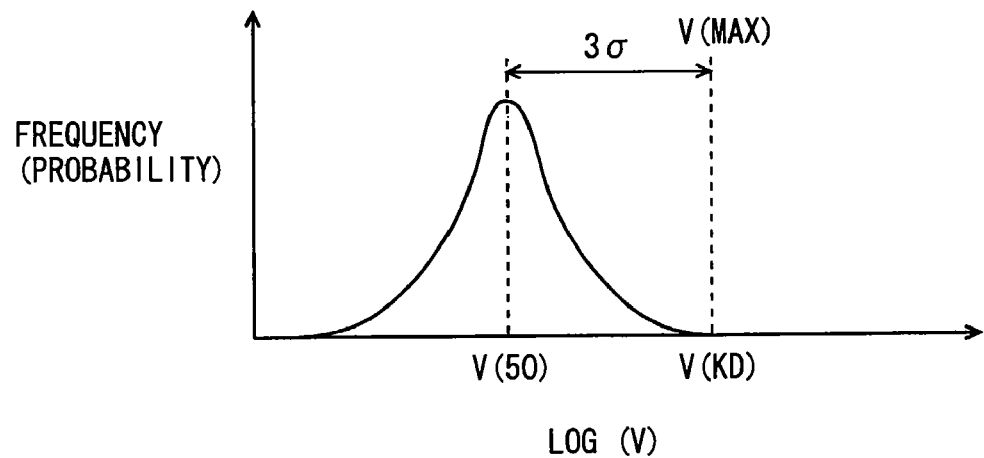
FIG. 9 is a chart (No. 2) showing frequency distribution of magnitude values LOG(V)
Figure 10:
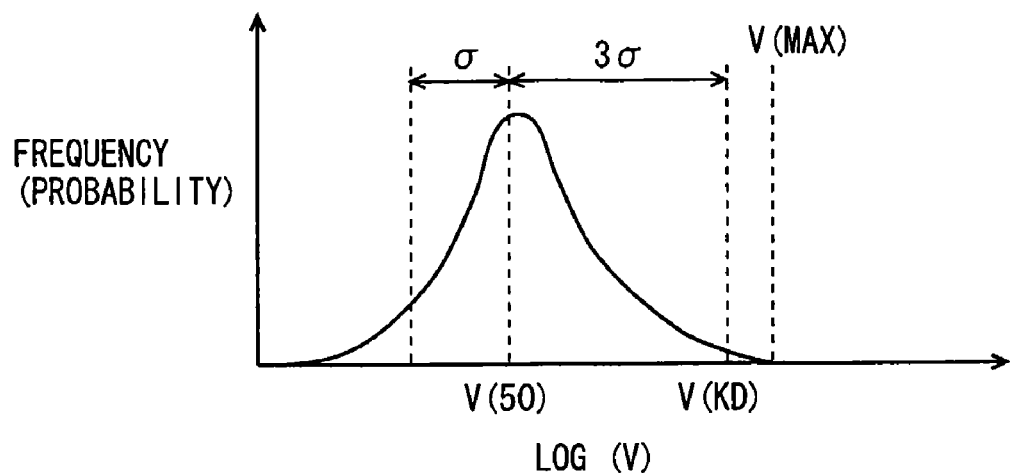
FIG. 10 is a chart (No. 3) showing frequency distribution of magnitude values LOG(V)

If a knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, by the occurrence of knocking, a greater magnitude V is detected. When a great magnitude value LOG(V) is calculated, as shown in FIG. 10, maximum value V(MAX) becomes greater than knock determination level V(KD).

Figure 11:
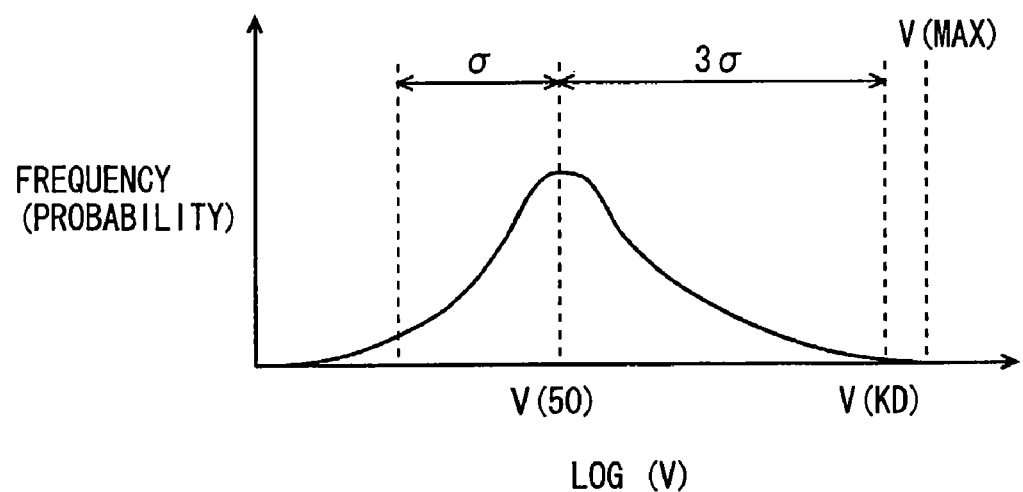
FIG. 11 is a chart (No. 4) showing frequency distribution of magnitude values LOG(V)

When the frequency of occurrence of knocking becomes further higher, as shown in FIG. 11, maximum value V(MAX) becomes further greater. Median value V(50) and standard deviation σ in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Figure 12:
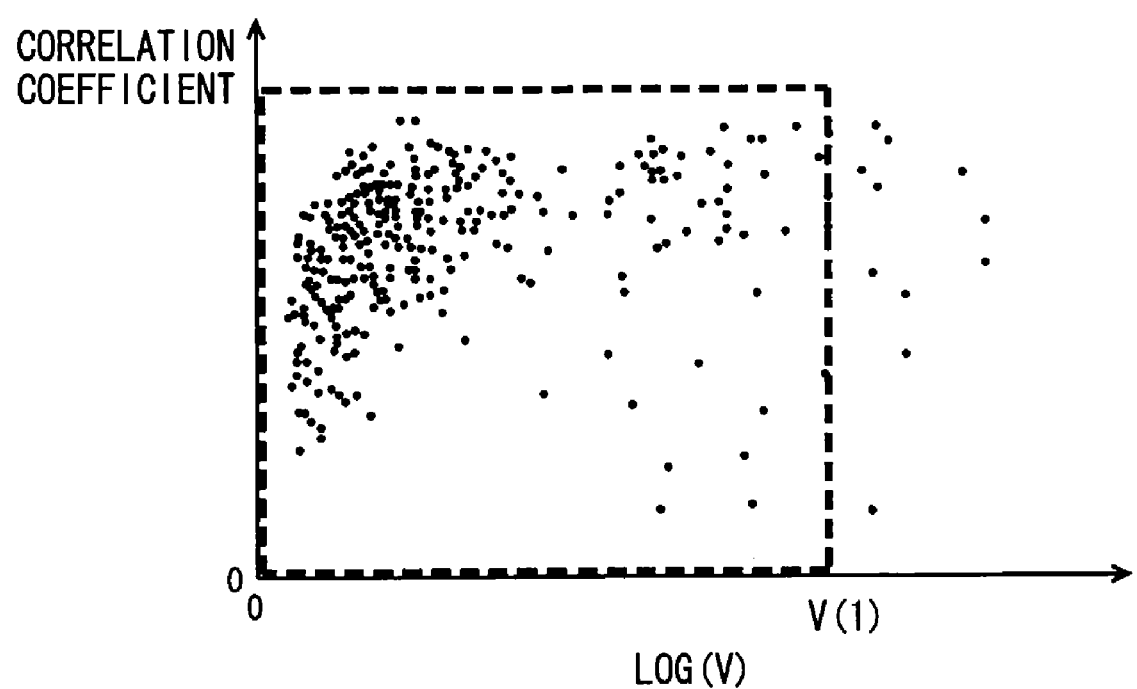
FIG. 12 is a chart showing magnitude values LOG(V) used for forming the frequency distribution of the magnitude values LOG(V)

Therefore, in the embodiment, magnitude values LOG(V) in a range surrounded with a broken line in FIG. 12 are used to exclude magnitude values LOG(V) greater than a threshold value V(1), to thereby obtain median value V(50) and standard deviation σ. FIG. 12 is a chart in which calculated magnitude values LOG(V) are plotted for each correlation coefficient K in a cycle in which the magnitude values LOG (V) are obtained.

Threshold value (1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation σ, knock determination level V(KD) can be suppressed from becoming excessively high. As a result, the frequency of determining that knocking has not occurred while knocking has actually occurred can be suppressed from becoming high.

The method of extracting magnitude values LOG(V) used for calculating median value V(50) and standard deviation σ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
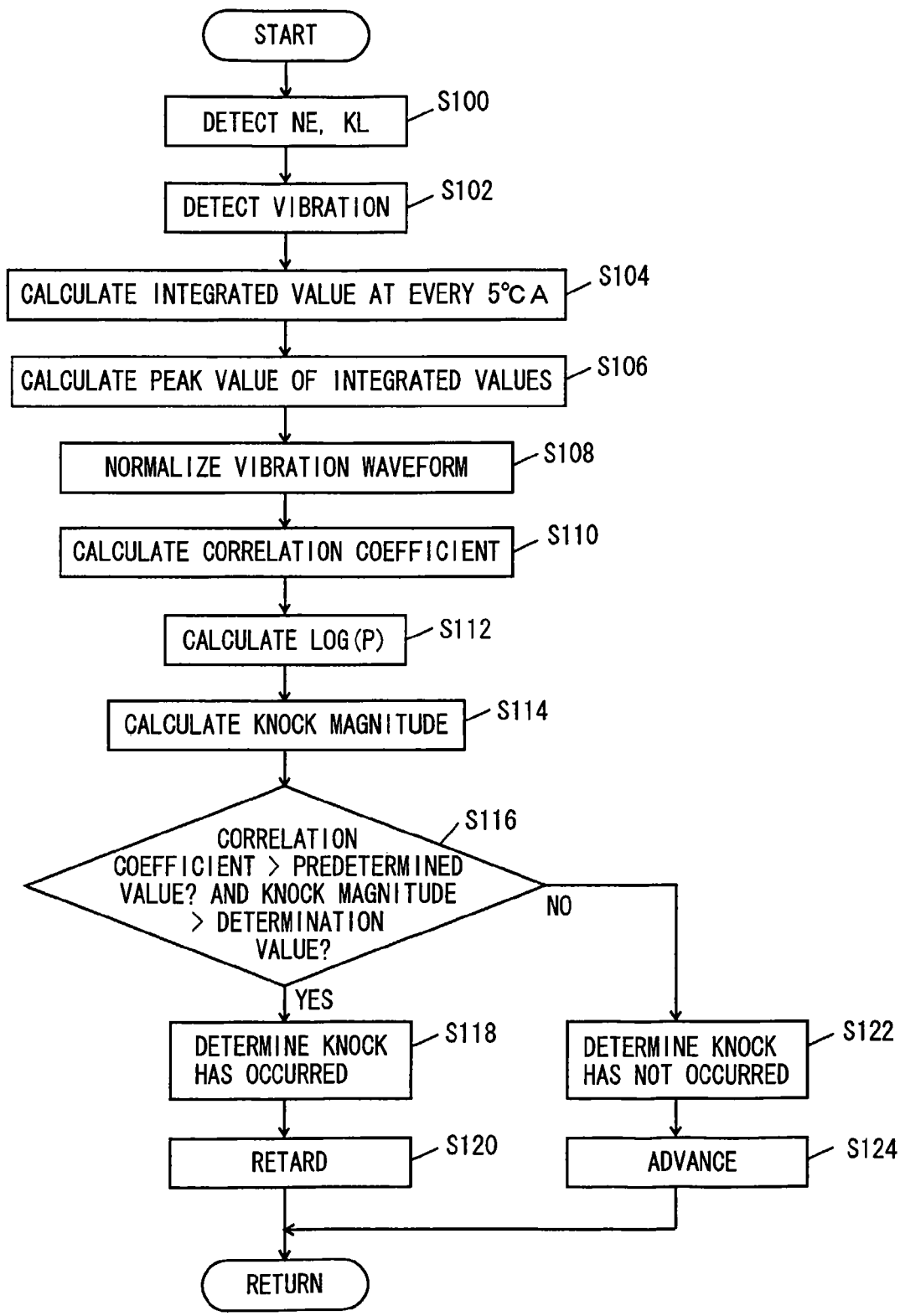
FIG. 13 is a flowchart (No. 1) showing a control structure of the program executed by the engine ECU in FIG. 1.

With reference to FIG. 13, a control structure, of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other.

In S112, engine ECU 200 calculates magnitude value LOG (P) obtained by logarithmically converting the calculated peak value P of integrated values. In S114, engine ECU 200 calculates knock magnitude N. As described above, knock magnitude N is calculated by equation, N=LOG(P)/BGL. A method of calculating BGL will be described later.

In S116, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S116), the processing moves to S118. Otherwise (NO in S116), the processing moves to S122.

In S118, engine ECU 200 determines that knocking has occurred in engine 100. In S120, engine ECU 200 retards the ignition timing. In S122, engine ECU 200 determines that knocking has not occurred in engine 100. In S124, engine ECU 200 advances the ignition timing.

Figure 14:
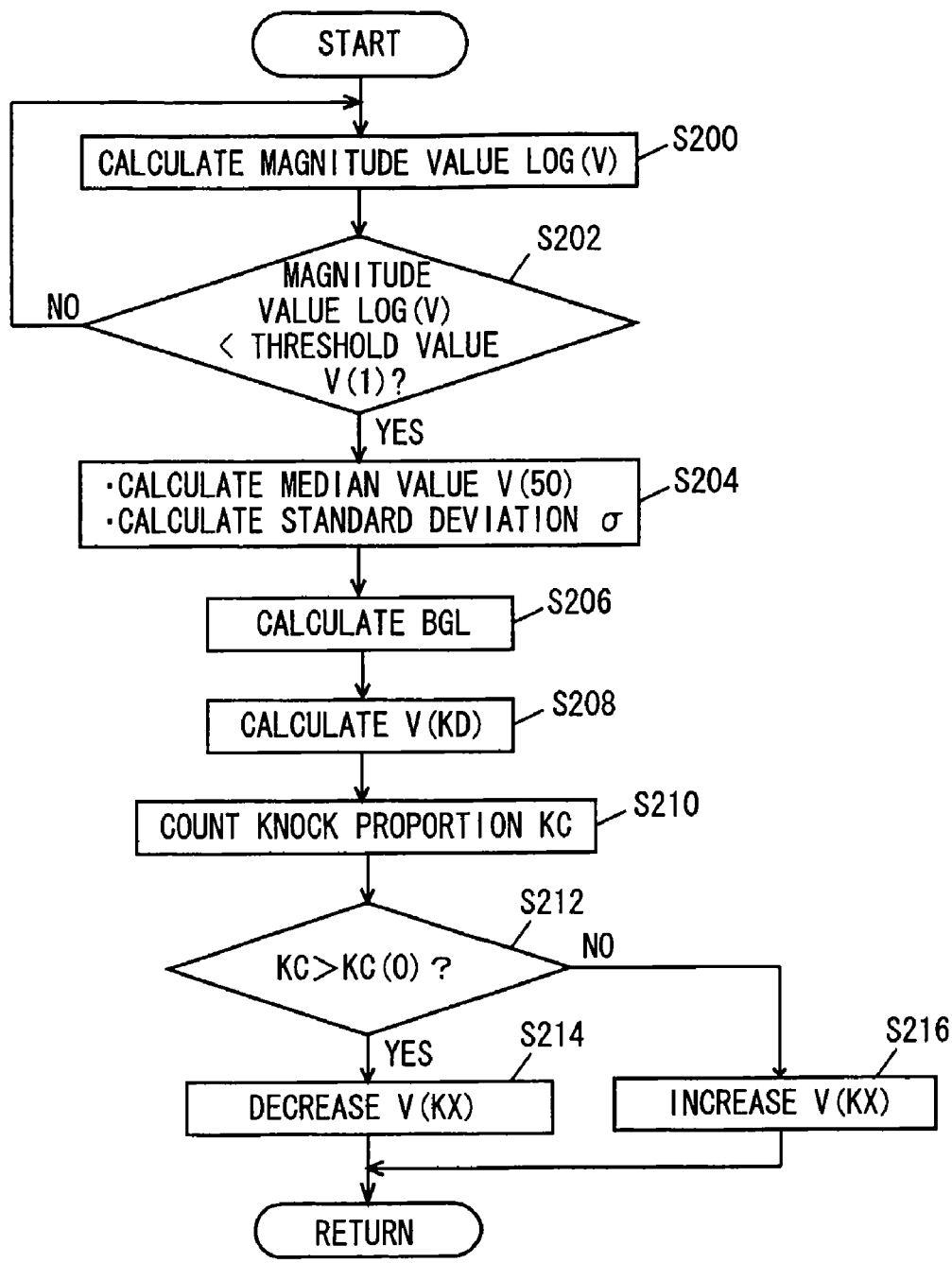
FIG. 14 is a flowchart (No. 2) showing the control structure of the program executed by the engine ECU in FIG. 1.

With reference to FIG. 14, a control structure of a program executed by engine ECU 200 which is the ignition timing control device according to the embodiment so as to calculate BGL using median value V(50) and standard deviation σ and to correct determination value V(KX) will be described.

In S200, engine ECU 200 calculates magnitude value LOG (V) from magnitude V detected based on a signal transmitted from knock sensor 300. Magnitude V is a peak value (peak value of integrated values at every 5°) between predetermined crank angles.

In S202, engine ECU 200 determines whether magnitude value LOG(V) is smaller than the aforementioned threshold value V(1). When magnitude value LOG(V) is smaller than the aforementioned threshold value V(1) (YES in S202), the processing moves to S204. Otherwise (NO in S202), the processing goes back to S200.

In S204, engine ECU 200 calculates median value V(50) and standard deviation σ of the extracted magnitude value LOG(V).

In S206, engine ECU 200 calculates BGL. BGL is a value obtained by subtracting the product of standard deviation σ and a coefficient U(3) (U(3) is a constant and U(3)=3, for example) from median value V(50). Coefficient U(3) is a coefficient obtained based on data and findings obtained by experiments and the like. The calculated BGL is used in the aforementioned S114. The method of calculating BGL is not limited to it.

In S208, engine ECU 200 calculates knock determination level V(KD) based on median value V(50) and standard deviation σ. In S210, engine ECU 200 counts the proportion of magnitude values LOG(V) greater than knock determination level V(KD) to the extracted magnitude values LOG(V) as a knock proportion KC.

In S212, engine ECU 200 determines whether or not knock proportion KC is greater than a threshold value KC(0). If knock proportion KC is greater than threshold value KC(0) (YES in S212), the processing moves to S214. Otherwise (NO in S212), the processing moves to S216. In S214, engine ECU 200 decreases determination value V(KX). In S216, engine ECU 200 increases determination value V(KX).

Operation of engine ECU 200 which is the ignition timing control device according to the embodiment based on the above configuration and flowcharts will be described.

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees, is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value ΔS(I) of the deviation of the vibration waveform after the normalization and the knock waveform model from each other at each crank angle is calculated. Based on the total of ΔS(I), i.e., ΣΔS(I) and value S obtained by integrating the magnitude of the vibration in the knock waveform model by the crank angle, correlation coefficient K is calculated by K=(S−ΣΔS(I))/S (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Besides correlation coefficient K, magnitude value LOG(P) is calculated by logarithmically converting peak value P of the integrated values (S112). Knock magnitude N is calculated by dividing magnitude value LOG(P) by BGL, which is a value representing magnitude of mechanical vibration specific to engine 100 (S114). Thus, knock magnitude N can be calculated as a value representing relative magnitude to BGL. As a result, knock magnitude N can be calculated as a value representing magnitude of vibration due to a factor other than the mechanical vibration specific to engine 100.

Meanwhile, actual magnitude of mechanical vibration of engine 100 hardly varies depending on whether knocking is present or absent. However, the magnitude of mechanical vibration of engine 100 has such characteristics that it is different for each individual engine 100 and varies by the load or speed of engine 100. Accordingly, in order to calculate knock magnitude N as a value precisely representing magnitude of vibration due to a factor other than the mechanical vibration of engine 100, BGL that reflects the characteristics of the actual magnitude of mechanical vibration of engine 100 must be calculated.

Therefore, magnitude value LOG(V) is calculated based on magnitude V detected in the actual operation condition of individual engine 100, for each range employing engine speed NE and intake air amount KL as parameters (S200). When calculated magnitude value LOG(V) is smaller than the aforementioned threshold value V(1) (YES in S202), median value V(50) and standard deviation σ are calculated (S204).

Figure 15:
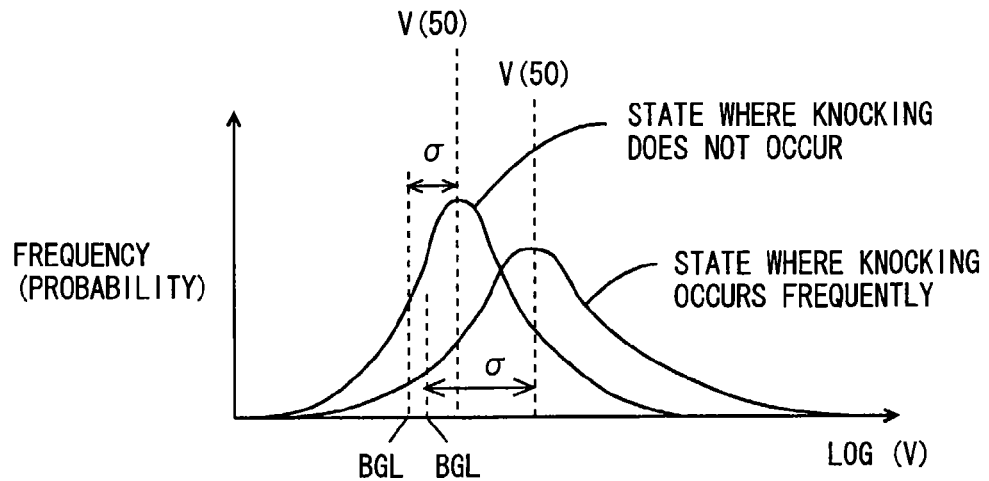
FIG. 15 is a chart (No. 5) showing frequency distribution of magnitude values LOG(V)

As shown in FIG. 15, magnitude LOG(V) calculated when knocking has occurred becomes greater than the vibration magnitude of upper limit in the vibration magnitude distribution of the internal combustion engine without knocking. Therefore, median value V(50) and standard deviation σ of magnitudes LOG(V) when knocking frequently occurs become greater than those when knocking does not frequently occur. Accordingly, the value obtained by subtracting the product of standard deviation σ and coefficient U(3) from median value V(50) is obtained as a stable value that hardly varies depending on whether knocking is present or absent.

Figure 16:
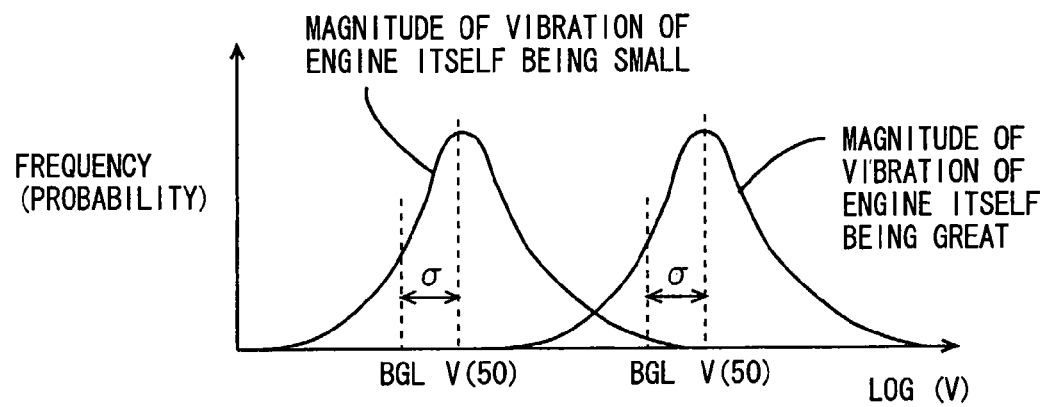
FIG. 16 is a chart (No. 6) showing frequency distribution of magnitude values LOG(V)

As shown in FIG. 16, median value V(50) becomes greater when magnitude of mechanical vibration of engine 100 is great than that when magnitude of mechanical vibration of engine 100 is small. The shape of vibration magnitude distribution is substantially the same when the magnitude of mechanical vibration of engine 100 is small and when it is great. Therefore, standard deviation σ is obtained as substantially the same value when the magnitude of mechanical vibration of engine 100 is small and when it is great. Accordingly, the value obtained by subtracting the product of standard deviation σ and coefficient U(3) from median value V(50) is specific to individual engine 100 and varies by the load or speed of engine 100.

Then, a value obtained by subtracting the product of standard deviation σ and coefficient U(3) from median value V(50) is calculated as BGL. As described above, the calculated BGL is obtained as a stable value that hardly varies depending on whether knocking is present or absent. BGL is a value specific to individual engine 100 and varies by the load or speed of engine 100. As a result, BGL reflecting the characteristics of actual mechanical vibration of engine 100 can be obtained. That is, BGL can be regarded as a value representing magnitude of mechanical vibration specific to engine 100. By dividing actually detected magnitude value LOG(P) by this BGL, knock magnitude N is calculated. Thus, knock magnitude N can be calculated as a value precisely representing magnitude of vibration due to a factor other than the mechanical vibration of engine 100.

Based on the calculated correlation coefficient K and knock magnitude N, it is determined whether or not knocking has occurred in each ignition cycle and the ignition timing is retarded or advanced. If correlation coefficient K is greater than a predetermined value and knock magnitude N is greater than a predetermined determination value (YES in S116), it is determined that knocking has occurred (S118) and the ignition timing is retarded (S120). As a result, occurrence of the knocking is suppressed. If correlation coefficient K is not greater than a predetermined value or knock magnitude N is not greater than a predetermined determination value (NO in S116), it is determined that knocking has not occurred (S122) and the ignition timing is advanced (S124).

Here, dividing magnitude value LOG(P) by BGL that can be regarded as a value representing magnitude of mechanical vibration specific to engine 100, knock magnitude N is calculated. As a result, knock magnitude N is calculated as a value precisely representing magnitude of vibration due to a factor other than the mechanical vibration specific to engine 100. Accordingly, whether knocking is present or absent can be determined precisely, and the ignition timing can be retarded or advanced appropriately.

Meanwhile, a magnitude of the same vibration occurring in engine 100 may be detected as different values due to variation in the output values and degradation of knock sensor 300. Accordingly, the value of knock magnitude N is detected as different values. Therefore, it is necessary to correct determination value V(KX) and to determine whether or not knocking has occurred by using determination value V(KX) corresponding to the magnitude detected actually.

Therefore, a knock determination value V(KD) is calculated based on median value V(50) and standard deviation σ used for calculating the above-described BGL (S208). The proportion of magnitude values LOG(V) greater than knock determination level V(KD) is counted as a knock proportion KC (S210). When knock proportion KC is greater than threshold value KC(0) (YES in S212), it can be recognized that knocking has been occurring more frequently than it is allowed. In this case, determination value V(KX) is decreased so that it is more easily determined that knocking has been occurring (S214). Thus, the frequency of determining that knocking has been occurring is increased, to thereby retard the ignition timing to suppress occurrence of knocking.

On the other hand, when knock proportion KC is smaller than threshold value KC(0) (NO in S212), it can be recognized that the frequency of knocking occurrence is within an allowable value. In such a case, it can be recognized that the output of engine 100 can further be increased. Therefore, determination value V(KX) is increased (S216). Thus, the determination value in knocking determination for each ignition cycle can be set to an appropriate value to thereby set the ignition timing appropriately.

As described above, with the engine ECU which is the ignition timing control device according to the embodiment, a median value and a standard deviation are calculated based on magnitude V detected in the actual operation condition of an individual engine. By subtracting the product of the standard deviation and a predetermined coefficient from a median value, BGL that is a value representing magnitude of mechanical vibration of the engine is calculated. The calculated BGL hardly varies depending on whether knocking is present or absent. However, the calculated BGL is different for each individual engine and varies by the load or speed of the engine. Thus, BGL can be regarded as a value representing magnitude of mechanical vibration specific to the engine, reflecting the characteristics of actual mechanical vibration of the engine. By dividing actually detected magnitude value LOG(P) by this BGL, knock magnitude N is calculated. Thus, a knock magnitude can be calculated as a value precisely representing magnitude of vibration due to a factor other than the mechanical vibration of the engine. Based on the comparison between this knock magnitude and a determination value V(KX), a knocking determination is carried out. Accordingly, whether knocking is present or absent can be determined precisely, and the ignition timing can be controlled appropriately.

As shown in FIG. 17, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 18, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the sum of the integrated values in the vibration waveform by BGL.

As shown in FIG. 18, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

Although the present invention has been described and illustrated in detail, it is clearly understood that the same is by way of illustration and example only and is not to be taken by way of limitation, the spirit and scope of the present invention being limited Only by the terms of the appended claims.

The invention claimed is:

1. A device for controlling ignition timing of an internal combustion engine, comprising:
   an operation unit, wherein
   said operation unit detects a set of magnitude values obtained by logarithmically converting magnitudes of vibrations of said internal combustion engine,
   said operation unit calculates a median value and a standard deviation of said set of magnitude values based on said set of magnitude values,
   said operation unit calculates a background level that is related to magnitude of vibration of said internal combustion engine by subtracting a product of said standard deviation and a predetermined constant from said median value,
   said operation unit calculates a knock magnitude related to magnitude of vibration of said internal combustion engine by dividing said magnitude value by said background level, and said operation unit controls ignition timing of said internal combustion engine based on a result of comparison between said knock magnitude and a predetermined value.

2. The device for controlling ignition timing of the internal combustion engine according to claim 1, wherein
said standard deviation is a standard deviation of the magnitude values that are smaller than a threshold value.

3. The device for controlling ignition timing of the internal combustion engine according to claim 1, wherein
said operation unit synthesizes a waveform based on said detected vibrations of said internal combustion engine and normalizes said synthesized waveform by a maximum value of said synthesized waveform,
said operation unit calculates a correlation coefficient based on deviations between said normalized waveform and a knock waveform model, and
said operation unit further controls ignition timing of said internal combustion engine based on a result of comparison between said correlation coefficient and another predetermined value.

4. A method of controlling ignition timing of an internal combustion engine, comprising:
detecting a set of magnitude values obtained by logarithmically converting magnitudes of vibrations of said internal combustion engine;
calculating a median value and a standard deviation of said set of magnitude values based on said set of magnitude values;
calculating a background level that is related to magnitude of vibration of said internal combustion engine by subtracting a product of said standard deviation and a predetermined constant from said median value;
calculating a knock magnitude related to magnitude of vibration of said internal combustion engine by dividing said magnitude value by said background level; and
controlling ignition timing of said internal combustion engine based on a result of comparison between said knock magnitude and a predetermined value.

5. The method of controlling ignition timing of the internal combustion engine according to claim 4, wherein
said standard deviation is a standard deviation of the magnitude values that are smaller than a threshold value.

6. The method of controlling ignition timing of the internal combustion engine according to claim 4, further comprising
synthesizing a waveform based on said detected vibrations of said internal combustion engine and normalizing said synthesized waveform by a maximum value of said synthesized waveform,
calculating a correlation coefficient based on deviations between said normalized waveform and a knock waveform model, and
controlling ignition timing of said internal combustion engine based on a result of comparison between said correlation coefficient and another predetermined value.

7. A device for controlling ignition timing of an internal combustion engine, comprising:
means for detecting a set of magnitude values obtained by logarithmically converting magnitudes of vibrations of said internal combustion engine;
means for calculating a median value and a standard deviation of said set of magnitude values based on said set of magnitude values;
first calculating means for calculating a background level that is related to magnitude of vibration of said internal combustion engine by subtracting a product of said standard deviation and a predetermined constant from said median value;
second calculating means for calculating a knock magnitude related to magnitude of vibration of said internal combustion engine by dividing said magnitude value by said background level; and
means for controlling ignition timing of said internal combustion engine based on a result of comparison between said knock magnitude and a predetermined value.

8. The device for controlling ignition timing of the internal combustion engine according to claim 7, wherein
said standard deviation is a standard deviation of the magnitude values that are smaller than a threshold value.

9. The device for controlling ignition timing of the internal combustion engine according to claim 7, further comprising
means for synthesizing a waveform based on said detected vibrations of said internal combustion engine and means for normalizing said synthesized waveform by a maximum value of said synthesized waveform,
third calculating means for calculating a correlation coefficient based on deviations between said normalized waveform and a knock waveform model, and
said means for controlling ignition timing of said internal combustion engine further control said ignition timing of said internal combustion engine based on a result of comparison between said correlation coefficient and another predetermined value.

10. A device for controlling ignition timing of an internal combustion engine, comprising:
an operation unit, wherein
said operation unit detects a set of magnitude values obtained by logarithmically converting magnitudes of vibrations of said internal combustion engine in a section between a first crank angle and a second crank angle,
said operation unit calculates a median value and a standard deviation of said set of magnitude values based on said set of magnitude values,
said operation unit calculates a background level that is related to magnitude of vibration of said internal combustion engine by subtracting a product of said standard deviation and a predetermined constant from said median value,
said operation unit calculates a knock magnitude related to magnitude of vibration of said internal combustion engine by dividing a sum of said magnitude values by said background level, said sum of said magnitude values being obtained by integrating magnitudes of vibration of said internal combustion engine in said section between said first crank angle and said second crank angle, and
said operation unit controls ignition timing of said internal combustion engine based on a result of comparison between said knock magnitude and a predetermined value.

11. A method of controlling ignition timing of an internal combustion engine, comprising:
detecting a set of magnitude values obtained by logarithmically converting magnitudes of vibrations of said internal combustion engine in a section between a first crank angle and a second crank angle;
calculating a median value and a standard deviation of said set of magnitude values based on said set of magnitude values;
calculating a background level that is related to magnitude of vibration of said internal combustion engine by subtracting a product of said standard deviation and a predetermined constant from said median value;

calculating a knock magnitude related to magnitude of vibration of said internal combustion engine by dividing a sum of said magnitude values by said background level, said sum of said magnitude values being obtained by integrating magnitudes of vibration of said internal combustion engine in said section between said first crank angle and said second crank angle; and controlling ignition timing of said internal combustion engine based on a result of comparison between said knock magnitude and a predetermined value.

12. A device for controlling ignition timing of an internal combustion engine, comprising:

means for detecting a set of magnitude values obtained by logarithmically converting magnitudes of vibrations of said internal combustion engine in a section between a first crank angle and a second crank angle;

means for calculating a median value and a standard deviation of said set of magnitude values based on said set of magnitude values;

first calculating means for calculating a background level that is related to magnitude of vibration of said internal combustion engine by subtracting a product of said standard deviation and a predetermined constant from said median value;

second calculating means for calculating a knock magnitude related to magnitude of vibration of said internal combustion engine by dividing a sum of said magnitude values by said background level, said sum of said magnitude values being obtained by integrating magnitudes of vibration of said internal combustion engine in said section between said first crank angle and said second crank angle; and means for controlling ignition timing of said internal combustion engine based on a comparison between said knock magnitude and a predetermined value.

* * * * *